(12) United States Patent
Parker et al.

(10) Patent No.: US 12,059,855 B1
(45) Date of Patent: Aug. 13, 2024

(54) METHOD FOR FORMING COMPOSITE ARTICLES

(71) Applicant: U.S. Government as Represented by the Secretary of the Army, Natick, MA (US)

(72) Inventors: Jason Parker, Grafton, MA (US); Tony Kayhart, Cambridge, MA (US); Damian Kubiak, Marlborough, MA (US); Robert Sykes, Burlington, MA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 397 days.

(21) Appl. No.: 17/029,117

(22) Filed: Sep. 23, 2020

Related U.S. Application Data

(63) Continuation of application No. 15/895,217, filed on Feb. 13, 2018, now abandoned.
(Continued)

(51) Int. Cl.
 *B29C 70/56* (2006.01)
 *B29C 70/46* (2006.01)
(Continued)

(52) U.S. Cl.
CPC .......... *B29C 70/56* (2013.01); *B29C 70/465* (2013.01); *F41H 1/08* (2013.01); *F41H 5/0485* (2013.01);
(Continued)

(58) Field of Classification Search
CPC ......... B29C 70/00; B29C 70/56; B29C 70/08; B29C 2793/0081; B29C 2791/00; B29C 43/02; B29C 70/44; B29C 51/28; B29C 2043/3649; B29C 1/12; B67D 2210/00131; B63C 11/06; Y01S 2/909; F41H 1/08; F41H 1/04; F41H 5/0485; F41H 5/04;
(Continued)

(56) References Cited

U.S. PATENT DOCUMENTS 2,420,522 A * 5/1947 Le .............................. F41H 1/08
 425/405.2
4,338,070 A * 7/1982 Nava ...................... A42B 3/063
 425/417

(Continued)

FOREIGN PATENT DOCUMENTS

| EP | 0585793 | * 10/1994 | ............... F41H 5/04 |
| KR | 100936056 | * 12/2009 | ............... F41H 1/04 |
| WO | 2013124233 | * 12/2013 | ............... F41H 1/08 |

*Primary Examiner* — Christopher M Rodd
*Assistant Examiner* — Shibin Liang
(74) *Attorney, Agent, or Firm* — Timothy M. Barlow

(57) ABSTRACT

A method of forming a net shape preform for a high performance ballistic helmet includes preparing one or more full prepreg plies, preparing one or more filler prepreg plies, wherein a shape and orientation of one filler prepreg ply of the one or more filler prepreg plies is different from a shape and orientation of another filler prepreg ply of the one or more filler prepreg plies, layering the one or more full prepreg plies with one or more filler prepreg plies to form a ply stack and deforming a portion of the ply stack while constraining the ply stack by applying in-plane tensional force to the ply stack to form the net-shape preform.

13 Claims, 19 Drawing Sheets

(Pattern B)

Related U.S. Application Data

(60) Provisional application No. 62/458,622, filed on Feb. 14, 2017.

(51) Int. Cl.
| | | |
|---|---|---|
| *B29K 77/00* | (2006.01) | |
| *B29K 105/08* | (2006.01) | |
| *B29K 307/04* | (2006.01) | |
| *B29L 31/00* | (2006.01) | |
| *F41H 1/08* | (2006.01) | |
| *F41H 5/04* | (2006.01) | |

(52) U.S. Cl.
CPC .. *B29C 2793/0081* (2013.01); *B29K 2077/10* (2013.01); *B29K 2105/0881* (2013.01); *B29K 2307/04* (2013.01); *B29L 2031/768* (2013.01)

(58) Field of Classification Search
CPC ........ B29K 2105/0872; B29K 2307/00; B29L 2031/4821; A42B 3/00; A42B 3/063; A42C 2/00; B32B 5/00; B32B 2260/04; A41D 13/05; C08J 5/04; B29D 3/00; B29D 9/04
See application file for complete search history.

(56) References Cited

U.S. PATENT DOCUMENTS 7,824,770 B2 * 11/2010 Honma ................ B29C 70/086
428/297.4
9,307,803 B1 * 4/2016 Folgar .................... B29C 43/02

* cited by examiner

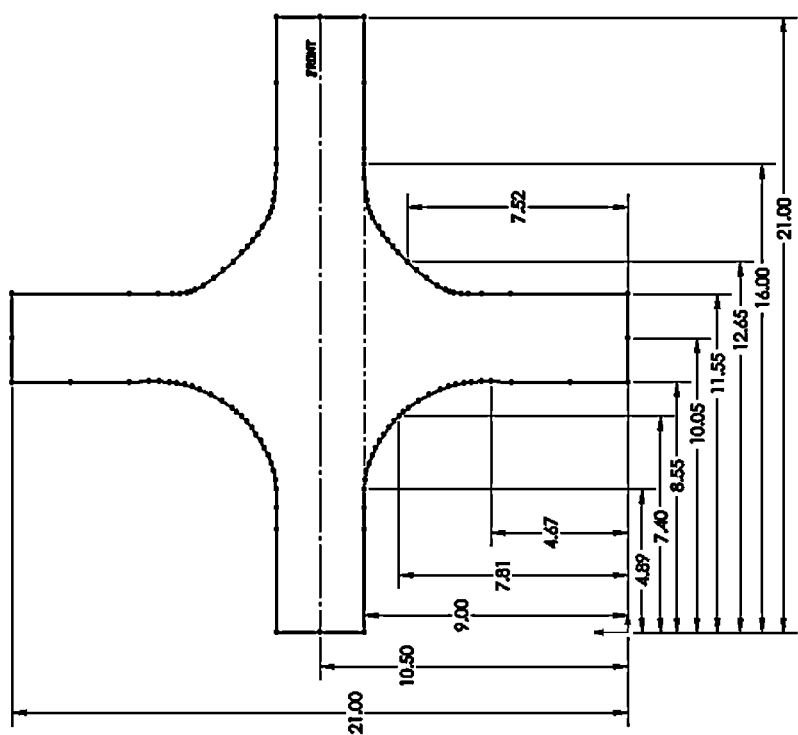
FIG. 6 (Pattern B)

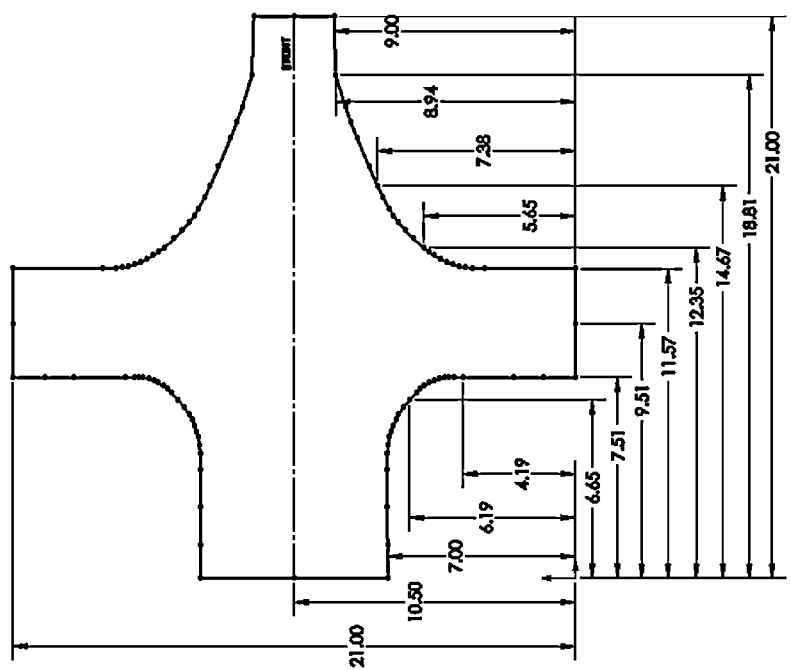
FIG. 7 (Pattern C)

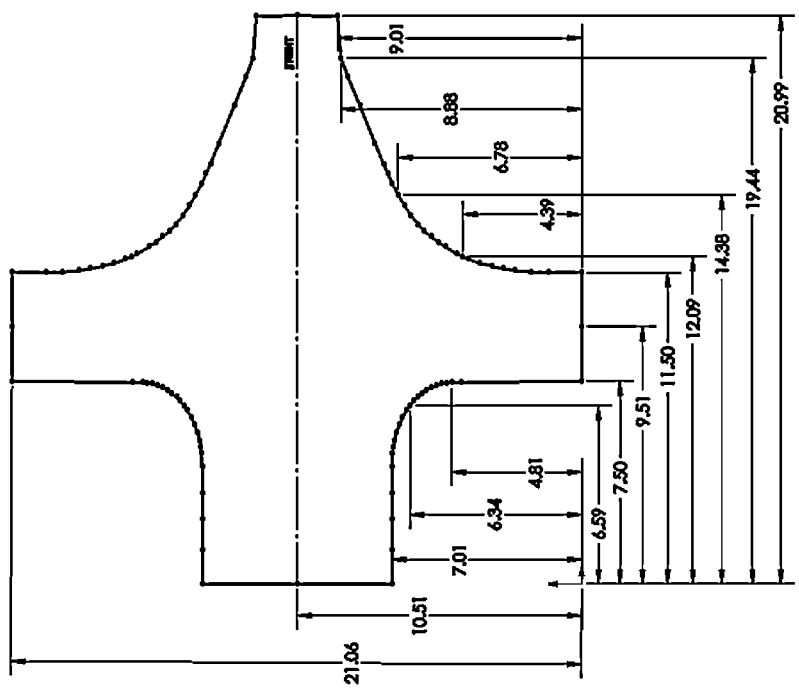
FIG. 8 (Pattern J)

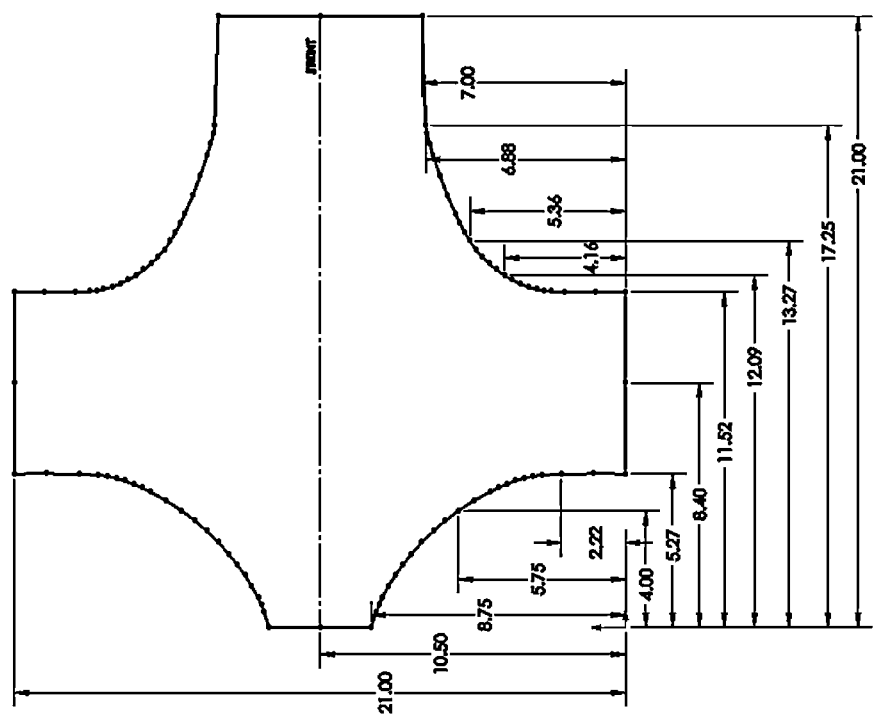
FIG. 9 (Pattern D)

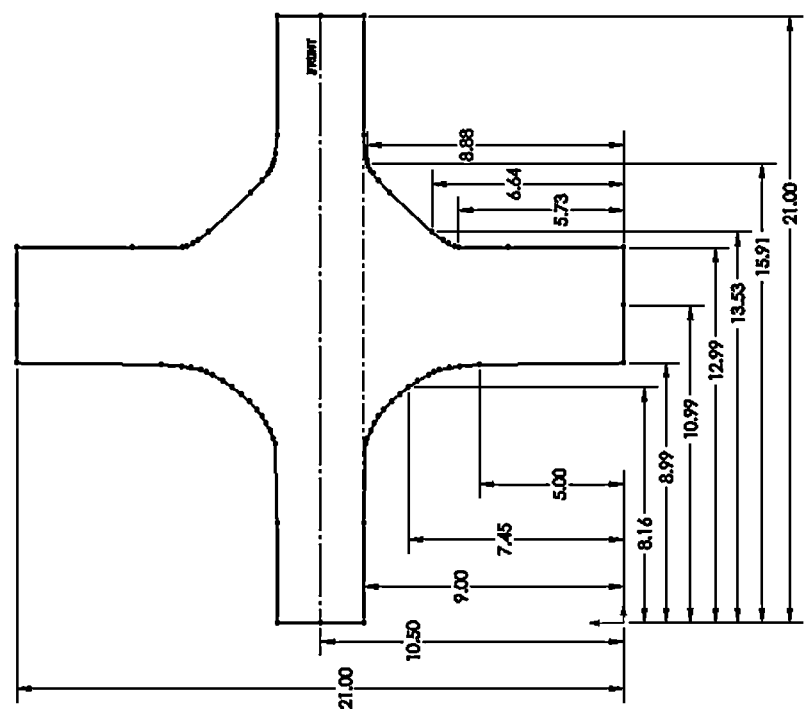
FIG. 10 (Pattern E)

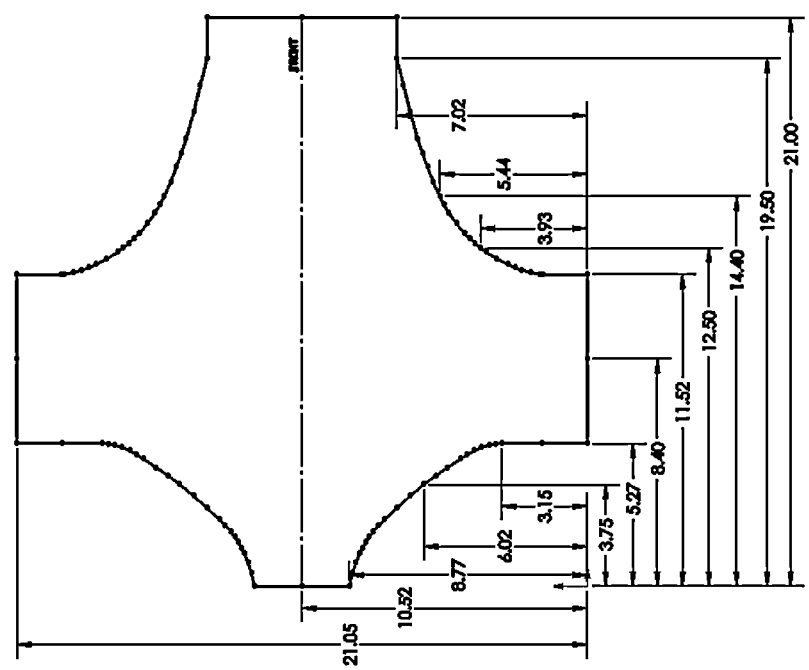
FIG. 11 (Pattern K)

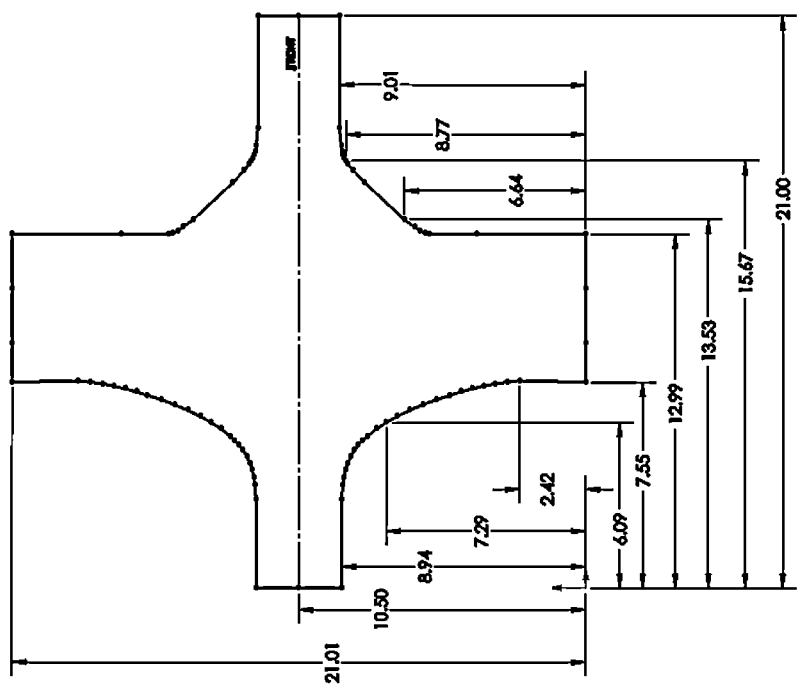
FIG. 12 (Pattern O)

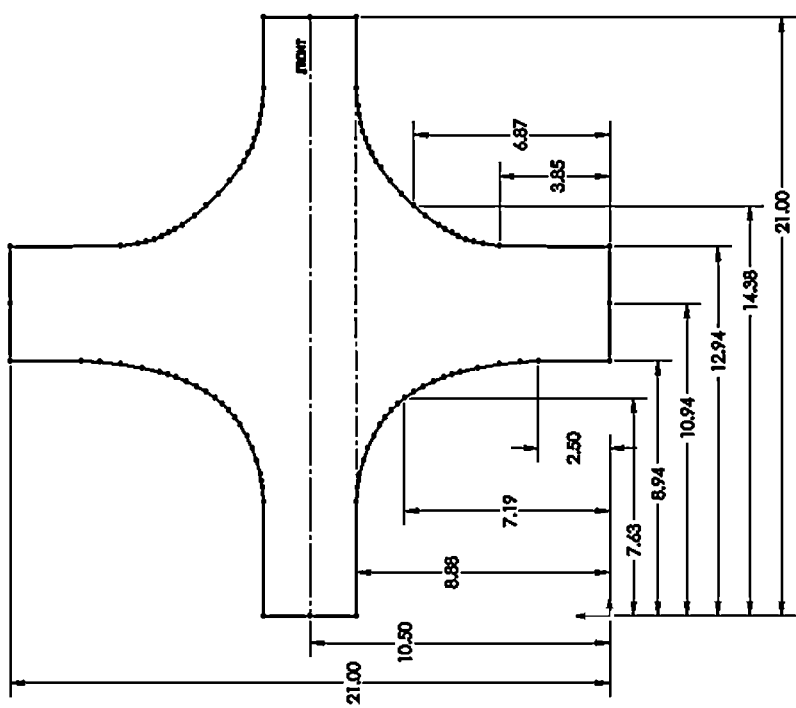
FIG. 13 (Pattern L)

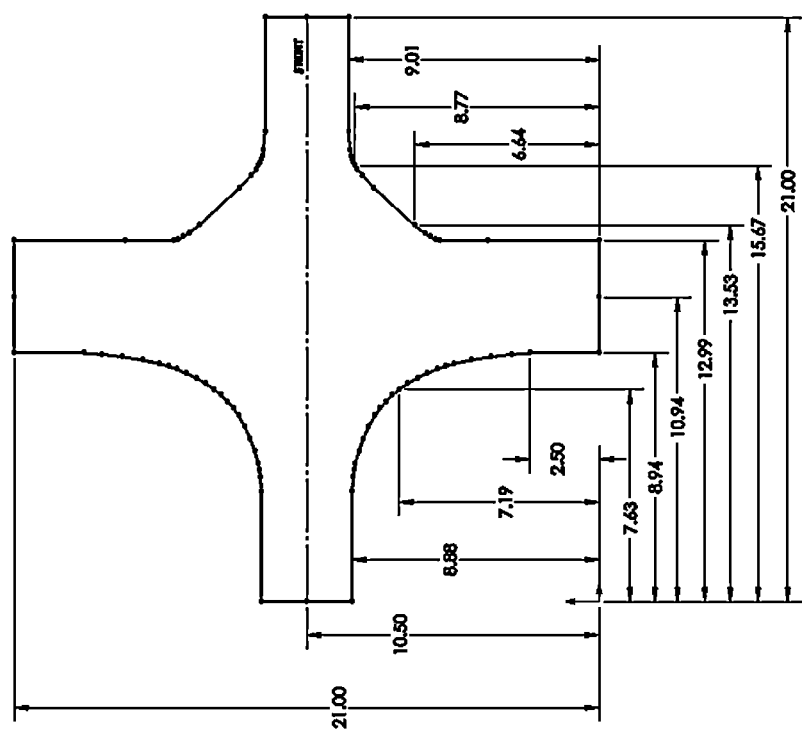
FIG. 14 (Pattern M)

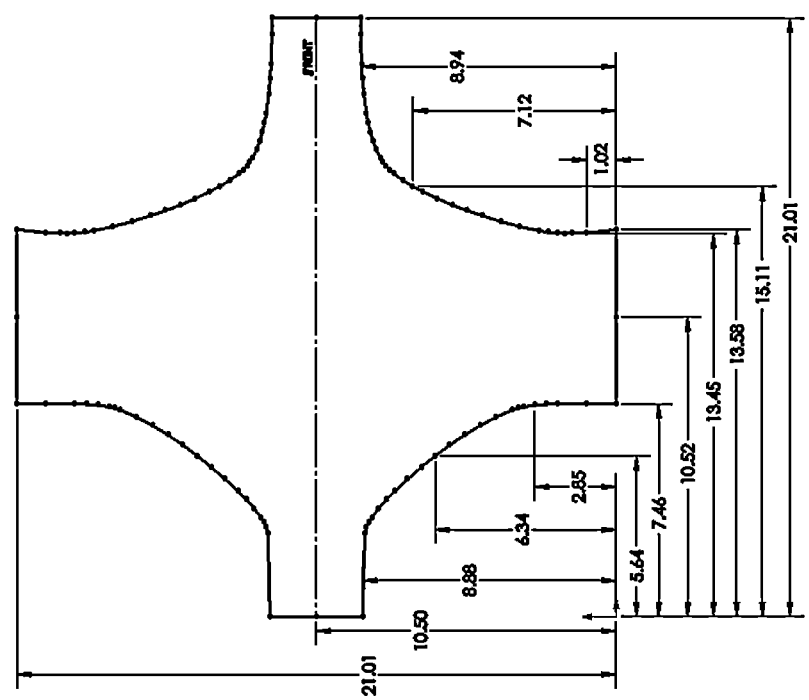
FIG. 15 (Pattern N)

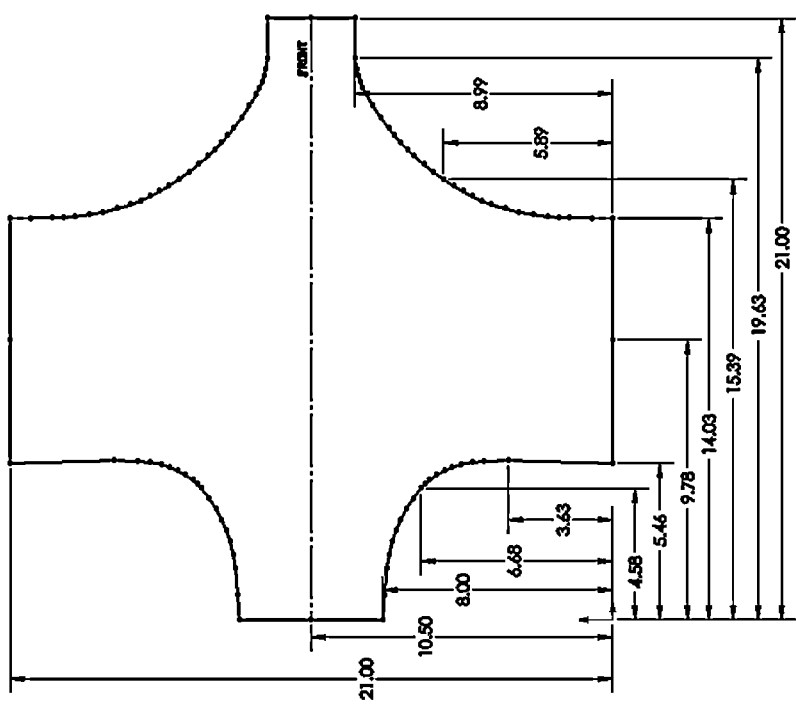
FIG. 16 (Pattern G)

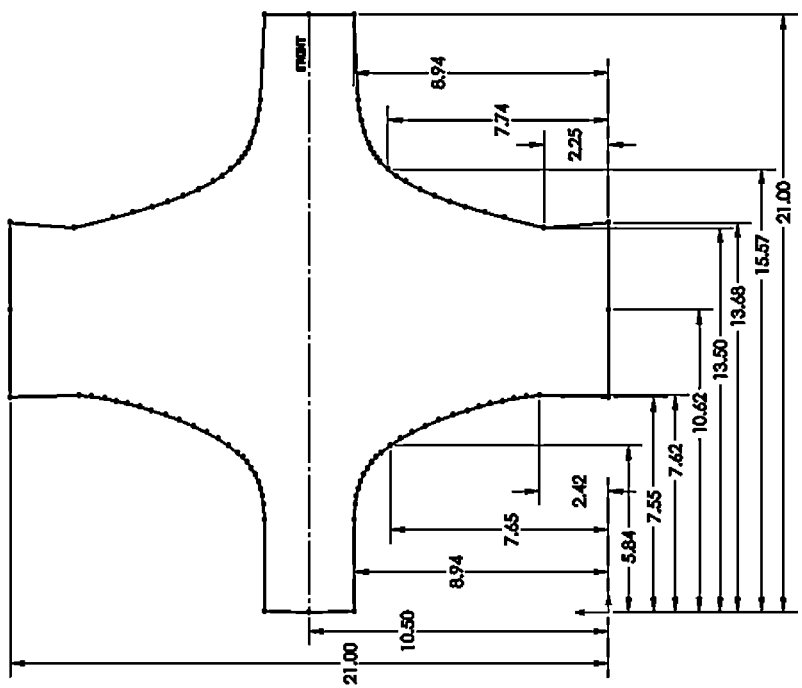
FIG. 17 (Pattern F)

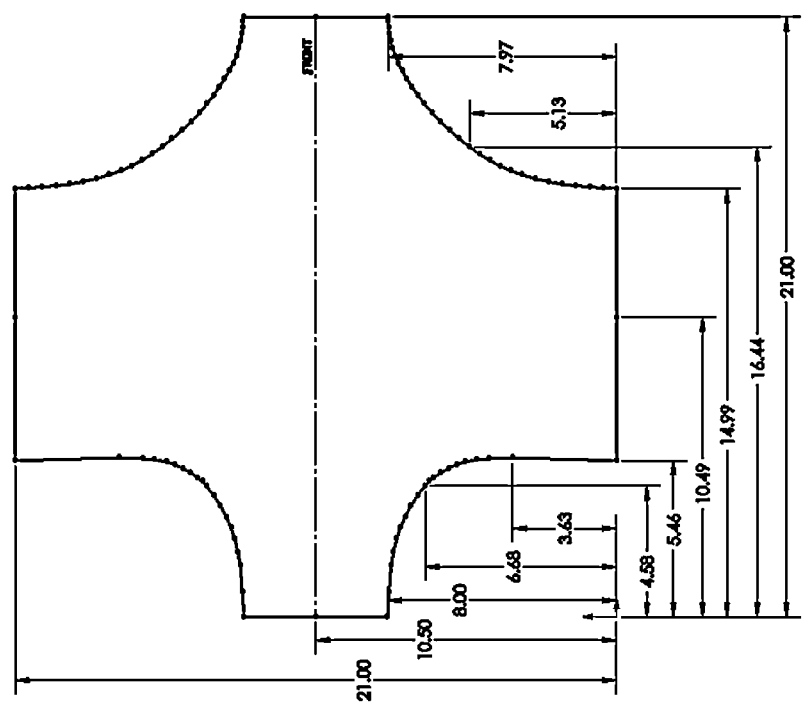
FIG. 18 (Pattern H)

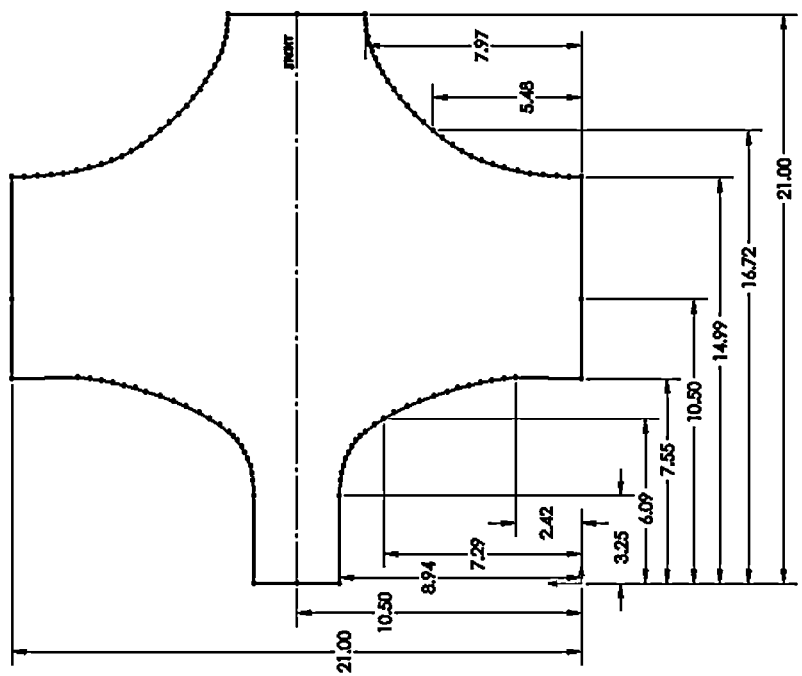
FIG. 19 (Pattern I)

METHOD FOR FORMING COMPOSITE ARTICLES

CROSS-REFERENCE TO RELATED APPLICATIONS

This application claims priority to and the benefit of U.S. Provisional Patent Application No. 62/458,622, filed on 14 Feb. 2017, the disclosure of which is incorporated herein by reference in its entirety.

STATEMENT OF GOVERNMENT INTEREST

The invention described herein may be manufactured and used by or for the U.S. Government for governmental purposes without the payment of any royalties thereon or therefore.

FIELD

The aspects of the disclosed embodiments relate to the field of high performance protective material products protective against ballistic threats, especially high power penetration projectiles. In particular, the aspects of the disclosed embodiments relate to ballistic helmets with pre-impregnated ("prepreg") fiber-reinforced composite materials.

BACKGROUND

High performance protective materials, such as those used to make protective helmets, are well known. Armor components which incorporate such protective materials generally include helmets, body armor, and other defensive tools such as barriers. These protective materials have been used both for military and non-military applications. Examples of non-military applications can include, but are not limited to, law enforcement, sporting and other applications that require protective and safety devices, such as helmets.

Helmets used for military and law enforcement uses generally need to provide ballistic protection. Typical high performance protective material products, such as helmets, are constructed to protect against high velocity fragments, bullets, and bullet fragments. Protection against rifle bullets requires significant improvement over current helmets in view of the high kinetic energy possessed by rifle bullets. Helmets and other products which protect against rifle bullets and other ballistic projectiles should be relatively lightweight and comfortable to wear, deploy or replace.

Typical high performance protective material products, such as helmets, are often made by methods in which multiple layers of materials are stacked together and then subjected to additional processing to convert these materials into high performance protective material products. However, these products typically suffer from structural imperfections resulting from for example, wrinkling of ply layers introduced in the manufacturing process. It would be advantageous to be able to provide defect free high performance protective materials components. Accordingly, it would be desirable to provide a product that addresses at least some of the problems identified above.

SUMMARY

The aspects of the disclosed embodiments are directed to high performance protective material products for providing protection against ballistic impacts, especially high kinetic energy penetration projectile. The subject matter of the independent claims overcomes one or more of the above or other disadvantages known in the art. Further advantageous modifications can be found in the dependent claims.

According to a first aspect of the disclosed embodiments the above and further objects and advantages are obtained by a helmet ballistic shell. In one embodiment, the helmet is formed from consolidated net shape preforms of pre-impregnated ("prepreg") fiber-reinforced composite materials.

According to a second aspect of the disclosed embodiments the above and further objects and advantages are obtained by a method for preparing a high performance ballistic protective component, such as a helmet ballistic shell with pre-impregnated ('prepreg") fiber-reinforced composite materials. In one embodiment, the method includes preparing, by for example, shaping or cutting one or more full prepreg plies. One or more filler prepreg plies are prepared, preferably by shaping or cutting, with a desired shape and orientation. The one or more full plies are layered with one or more filler plies to form a ply stack. The ply stack will generally include from approximately 2 to 400 layers, more specifically 10-150 layers and more specifically 50-120 layers. In one embodiment, a punch is disposed to the top or bottom of the ply stack and actuated to at least deform a portion of the ply stack while constraining the ply stack around the periphery. In-plane tensional forces are applied to the plies controlling in-plane shear strain and preventing out-of-plane wrinkling to form a net-shape preform.

According to a third aspect of the disclosed embodiments the above and further objects and advantages are obtained by a method of preparing a high performance ballistic protective component, such as a helmet ballistic shell, in a die press apparatus. In one embodiment, the method includes preparing, by for example, shaping or cutting, one or more full prepreg plies to fit on a flat die plate of the die press apparatus. One or more filler prepreg plies are prepared with a desired shape and orientation to fit on the flat die plate. One or more full plies are layered with one or more filler plies to form a ply stack. In one embodiment, the ply stack may be preheated to a temperature of 50-500° C., more preferably 80-200° C., more preferably about 125° C., for a period of about 1 minute to 24 hours, more preferably 30 minutes. The ply stack is located in the die press apparatus, between the flat die plate with a cutout and a binder plate. A punch is activated to drive at least a portion of the ply stack through the flat die plate cut out. The binder plate is independently actuated constraining the ply stack by applying in-plane tensional force through the binder plate to the plies controlling in-plane shear strain and ply stack wrinkling, to form a net-shape preform for the helmet ballistic shell.

In a further possible implementation form of the method each binder plate is actuated by multiple independent actuators (such as hydraulic, pneumatic, electric or manual) allowing independent adjustment of binder force to regions around the periphery of the die stack.

In a further possible implementation form of the method, the method includes placing or applying an elastomeric sealing membrane between the ply stack and the flat die plate and taken together with an O-ring sealed pressure vessel sealing the ply stack. In one embodiment, the elastomeric sealing membrane can be used in lieu of a pressure vessel.

In a further possible implementation form of the method, the method includes placing or applying a release film, agent or layer between the ply stack and the binder plate.

In a further possible implementation form of the method, the method includes placing or applying a release film, agent or layer between the ply stack and the punch preforming tool.

In a further possible implementation form of the method, the ply stack is clamped between the die plate and the binder plates before being preheated.

In a further possible implementation form of the method, the method includes pressurizing the pressure vessel in order to apply sufficient force normal to the ply stack around the surface of the punch as the punch is actuated through the die-plate so as to inhibit or totally prevent wrinkling, and also provide some preliminary level of consolidation to the preform.

In a further possible implementation form of the method, the pressure vessel is pressurized to 1-340 atm (10-5000 psi), more preferably 1-14 atm (10-200 psi), most preferably about 3.5 atm (50 psi).

In a further possible implementation form of the method, the pressure in the pressure vessel is varied between 1-14 atm (10-200 psi) as a function of time (or displacement) as the punch is actuated through the opening in the die plate.

In a further possible implementation form of the method, the pressure vessel is pressurized to between 1-14 atm (10-200 psi) only after the punch is completely through the opening in the die plate.

In a further possible implementation form of the method, the filler prepreg plies are generally cross or cruciform shaped and may have curvature or radii where the arms meet in the center.

In a further possible implementation form of the method the filler prepreg ply shapes vary throughout the ply stack.

In a further possible implementation form of the method, the desired filler prepreg ply shapes vary throughout the ply stack forming a series of progressively narrower X-shaped lobes.

In a further possible implementation form of the method, the desired filler prepreg plie shapes vary throughout the ply stack forming a series of progressively narrow cruciform X-shaped lobes.

In a further possible implementation form of the method the series of progressively narrower X-shaped lobes can be orderly dispersed through the ply stack.

In a further possible implementation form of the method the series of progressively narrower X-shaped lobes can be randomly dispersed through the ply stack.

In a further possible implementation form of the method the rotational orientation of the 0 degree and 90 degree fiber layers within both filler and full prepreg plies may be varied to optimize the final consolidated helmet ballistic shell.

In a further possible implementation form of the method, the prepreg sheets may have a 0/30/60/90 degrees offset.

In a further possible implementation form of the method, the arms or lobes of the filler plies may extend into the region covered by the binder plate.

In a further possible implementation form of the method, the binder plates independently actuate, constrain, and apply in-plane tensional force to the plies controlling in-plane shear strain and ply stack wrinkling by varying the in-plane tension forces around the ply stack, that are created when the ply stack is pushed through the flat die plate cutout during preforming.

In a further possible implementation form of the method, the binder plates may also include heating or cooling means so as to further facilitate the aforesaid processes.

In a further possible implementation form of the method, the method includes consolidating the preform in a pressure vessel at a temperature from about 100-300° C. (preferably 300° F., 150° C.), pressure (400 psi-15000 psi, 68 atm-340 atm; preferably 5000 psi), for a time period until consolidation is achieved.

In a further possible implementation form of the method, the time period until consolidation is achieved is in the range of approximately 5 minutes to and including 5 hours.

In a further possible implementation form of the method the consolidating pressure vessel may have one or more water jackets for circulation of heated fluid at a temperature from about 100-300° C. (preferably 300° F., 150° C.), pressure (400 psi-15000 psi, 68 atm-340 atm; preferably 5000 psi), for a time period until consolidation is achieved (5 minutes-5 hr).

In a further possible implementation form of the method the preform is consolidated in a matched die tool.

In a further possible implementation form of the method the preform is consolidated in a matched die tool, a compliant material is placed between the preform and the cavity of the mold and is confined around the bottom periphery of the preform.

In a further possible implementation form of the method, the preform is consolidated in a matched die tool and a compliant material is placed between the preform and the cavity of the mold and the compliant material is not confined around the bottom periphery of the preform.

In a further possible implementation form of the method, the preform is consolidated in a two-step process within a matched die tool. The preform is first consolidated without the compliant material placed between the preform and the cavity, followed by a second step where a compliant material is placed between the preform and the cavity of the mold and confined around the bottom periphery of the preform.

In a further possible implementation form the preform is consolidated in a two-step process within a matched die tool. The preform is first consolidated without the compliant material placed between the preform and the cavity, followed by a second step where a compliant material is placed between the preform and the cavity of the mold and is not confined around the bottom periphery of the preform.

In a further possible implementation form of the method, the filler plies are in shapes other than generally X-shaped.

In a further possible implementation form of the method, the pressure vessel is sealed about the preform.

According to a fourth aspect of the disclosed embodiments the above and further objects and advantages are obtained by an apparatus for forming helmet ballistic shells with pre-impregnated ('prepreg") fiber-reinforced composite materials. In one embodiment the apparatus is a die press apparatus. The die press apparatus of the disclosed embodiments includes an actuating punch preforming tool. The actuating punch preforming tool can be pneumatic, hydraulic, electric, or manual actuating, such as for example, a ball screw driven by a servomotor. The apparatus also includes a flat die plate with a cut-out. The apparatus is configured to drive the punch through the opening.

In a possible implementation form of the apparatus, the apparatus includes a pressure vessel. The pressure vessel has an offset distance which constitutes a die gap. The pressure vessel is disposed underneath the die plate.

In a possible implementation form of the apparatus the die plate is sealed to the pressure vessel with an O-ring.

In a possible implementation form of the apparatus, the actuating punch preforming tool has a desired product shape, such as for the helmet ballistic shell.

In a possible implementation form of the apparatus, the actuating punch preforming tool is in the shape of the inner surface of the net-shape preform.

In a further possible implementation form of the apparatus, the cut out or opening in the die plate is in the shape of a projection of the base of the punch and/or one or more actuating binder plate(s).

In a further possible implementation form of the apparatus, the binder plate is flat or curved.

In a further possible implementation form of the apparatus the actuating punch is drivable at least a portion of the way through the flat die plate cut out.

In a further possible implementation form of the apparatus each of the binder plates is independently actuatable.

In a further possible implementation form of the apparatus, the apparatus is contained inside a temperature controlled enclosure such as an oven or environmental chamber.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIGS. 6 through 19 illustrate exemplary filler ply patterns and shapes for the helmet ballistic shell of the disclosed embodiments.

DETAILED DESCRIPTION

Figure 1:
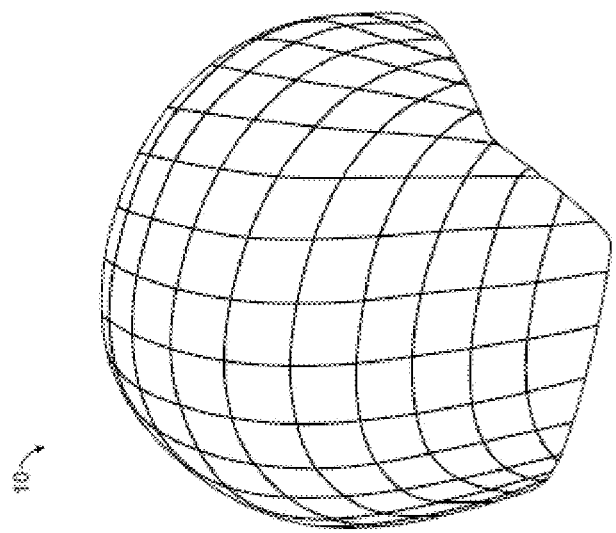
FIG. 1 illustrates an exemplary helmet ballistic shell including aspects of the disclosed embodiments.

The aspects of the disclosed embodiments are generally directed towards forming high performance protective material products configured to protect against ballistic impacts, especially high power penetration projectiles. FIG. 1 illustrates a helmet ballistic shell 10 for a military style ballistic helmet incorporating aspects of the disclosed embodiments. While a military style ballistic helmet is generally described herein, the aspects of the disclosed embodiments are not so limited. In alternate embodiments, the high performance protective material products of the disclosed embodiments can include any suitable type of protective, or armour, product, for military or non-military applications. As will be understood, the various diagrams, flow charts and scenarios described herein are only examples, and there are many other scenarios to which the aspects of the disclosed embodiments will apply.

Figure 2:
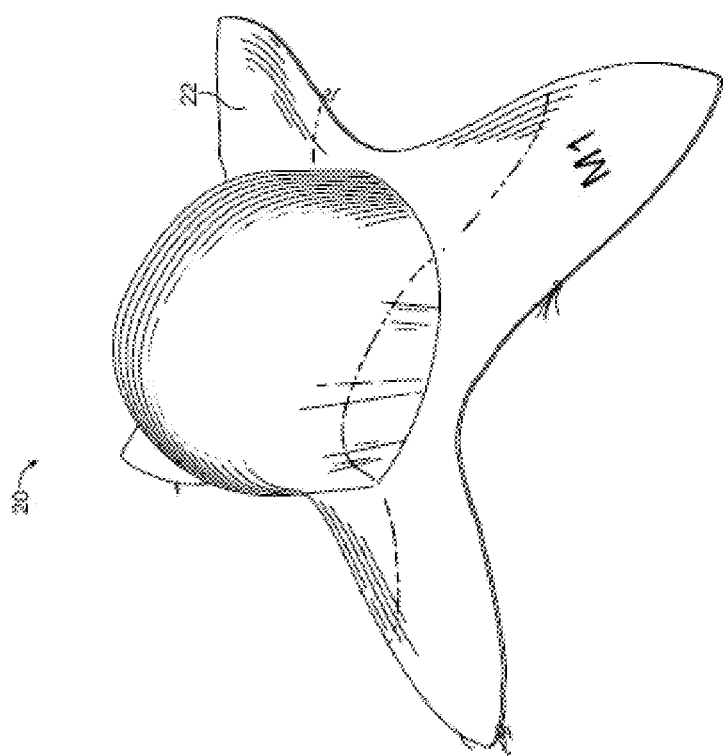
FIG. 2 illustrates an exemplary unconsolidated preform for the helmet ballistic shell of the disclosed embodiments.

FIG. 2 illustrates an unconsolidated preform 20 that can be used to produce the helmet ballistic shell 10 of FIG. 1. As will be further described below, forming a net shape preform for the helmet ballistic shell 10 of FIG. 1 generally includes preparing one or more full prepreg plies, preparing one or more filler prepreg plies with desired shapes and orientations, layering the one or more full plies with one or more filler plies to form a ply stack, and deforming a portion of the ply stack while constraining the ply stack by applying in-plane tensional force to the plies to form a net-shape preform of the helmet ballistic shell 10. As is described further herein, the processes are intended to be cost effective and produce military style ballistic helmets that have superior ballistic performance relative to current manufacturing methods for helmets and other lightweight armor components.

The unconsolidated preform 20 shown in FIG. 2 generally includes one or more pre-impregnated ("prepreg") fiber-reinforced composite materials 22, or prepreg sheets, also referred to as prepreg working material. These prepreg fiber-reinforced composite materials 22 can include for example, but are not limited to ultra-high molecular weight polyethylene (UHMWPE) and aramid fiber-based composite materials. Notable commercial examples of UHMWPE include, but are not limited to, SPECTRA® made by Honeywell International Inc., and DYNEEMA® made by Royal DSM N.V., both of which are sold in the form of composite prepreg sheets having uni-directional fiber orientations ("UD prepreg"). The prepreg working material may also comprise a metallic material, an aramid fiber-based composite material, a carbon material, a plastic-based composite material (which may be UD prepreg), or any combinations thereof. In some other aspects, the working material could comprise a fibrous material (e.g., pre-preg, aramid) and a non-fibrous material (e.g., carbon, metal). In alternate embodiments, the materials and fibers may include carbon and glass composites.

These prepreg working materials or prepreg sheets generally comprise one or more distinct layers. Such commercially available prepreg sheets are often sold as 2-plies or 4-plies (2 layer and 4 layer respectively).

In additional alternate embodiments, the prepreg working material could comprise at least one prepreg sheet, at least one layer of an aramid-based composite material, and at least one layer of a carbon-based composite material. In this example, the prepreg working material is configured as a "stack-up" or "lay-up" having the prepreg sheet(s) at the core. The at least one layer of aramid-based composite material is located on one or both sides of the prepreg sheet(s), and the at least one layer of carbon-based composite material forming the outermost layer(s) of the stack-up.

In an exemplary aspect, the layers of aramid-based composite material comprises first and second aramid-based composite layers and the layers of carbon-based composite material comprises first and second carbon-based composite layers. In this example, the working material is arranged into a stacked configuration. The order of the stacked configuration can include, from a top layer to a bottom layer: the first carbon-based composite layer; the first aramid based composite layer; at least one prepreg sheet; a second aramid-based composite layer; and a second carbon based composite layer.

In other aspects, the prepreg working material may comprise a first uni-directional prepreg layer having a first fiber orientation and a second uni-directional prepreg layer having a second fiber orientation. In this example, the first and second fiber orientations are generally orthogonal (i.e., arranged at approximately 90 degrees relative to each other). Other common orientations can include 30 degree and 60 degree angular offsets.

The descriptions of the disclosed embodiments will include the terms "full prepreg plies" and "filler prepreg plies." Full prepreg plies are plies which cover more than the entire area of the component to be formed and fabricated. Filler prepreg plies are plies which have had some of their area removed prior to assembling the stack-up assembly of plies. The selective removal of material from filler prepreg plies as described herein allows the helmet shell, or other curved shapes, to be formed and consolidated such that the finished component has uniform thickness and minimal or no defects, such as voids and wrinkles. A number of exemplary filler prepreg ply shapes are shown in FIGS. 6 through 19. These exemplary filler ply shapes were formed by cutting away material in areas to locally increase the net shape preform or consolidated thickness. Filler plies and full plies may extend into the area covered by the binder plate, as will be described herein. The dimensions shown in FIGS. 6 through 19 are merely exemplary and are provided solely as a guideline on the typical types of geometries that might be expected. Tolerances on each of the dimensions shown in FIGS. 6 to 19 can be in the range of plus (+) or minus (−) approximately one (1) inch. In alternate embodiment, any suitable dimensions can be implemented, other than including those shown in FIGS. 6-19, depending upon the particular application.

The aspects of the disclosed embodiments generally include a ply shaping process, a net-shape forming process and a multi-step consolidation process.

Ply Shaping Process

This first step generally involves cutting sections of pre-impregnated material into specific shapes, referred to herein as "plies" or "ply" from a larger sheet to facilitate the subsequent net-shape forming and consolidation steps. The prepreg material is typically commercially sold in large sheets or can be prepared by methods well known to those skilled in the art. Custom sized sheets are also available. A ply may also be modified after it is shaped.

During the net-shape forming step, flat prepreg sheets (swatches) are formed into compound-curved helmet shaped preforms. The exemplary filler ply shapes shown in FIGS. 6-19 were developed by cutting away material in the areas that were identified and quantified to locally increase net-shape preform or consolidated thickness.

During the forming process, the sheets undergo intra-ply shear of various degrees in various locations. The intra-ply shear causes the fiber-to-fiber angles to deviate from the original [0/90] angular configuration and local thickening of the ply occurs in these areas.

It is important for the subsequent consolidation step that the net-shape preform is of uniform thickness in order to insure that uniform consolidation pressure/temperature is obtained during the consolidation step. In order to insure that the net-shape preform is of uniform thickness, material is removed from key locations on a portion of some plies (the "filler plies") before the net-shape forming takes place. As a result of this variation in thickness, a series of shapes was developed where material was cut away from the corner regions of the initially cut sheets. Although any desired cut is possible, including cutting desired preform directly from commercially available large sheets, particularly useful cuts are cruciform, square, rectangular, or circular. Ultimately, the desired cut is that designed to maintain a uniform product thickness. Without this modification of a prepreg sheet material, the preformed helmet layup would produce a difference in thickness across the surface of the helmet preform such that the matched-die consolidation helmet tool would be ineffective. The goal is to have a preform of uniform thickness, so the matched-die tool would apply a balanced uniform pressure across the surface of the helmet preform for proper consolidation.

During the preforming process (such as computer generated or by iterative device simulation), a thickness profile may be created. Thickness changes may be mapped to a grid pattern. From this thickness profile, sequential "filler ply" shapes may be developed for a desired ply stack by cutting away select material in the areas that have a projected increase in thickness. Although computer methods exist (such as ply draping algorithms or through Finite Element Analysis utilizing software such as Abaqus™) or can be easily coded to calculate optimally removed material, it is beneficial to prototype net-shape preforms. By blending various "filler ply" shapes and full ply sheets into a layup the end result is a helmet with uniform thickness and consolidation. Using this method, consolidated part thickness was controlled typically be within approximately 127 μm (0.005 in.) to 305 μm (0.012 in.) of the intended thickness.

Figure 3:
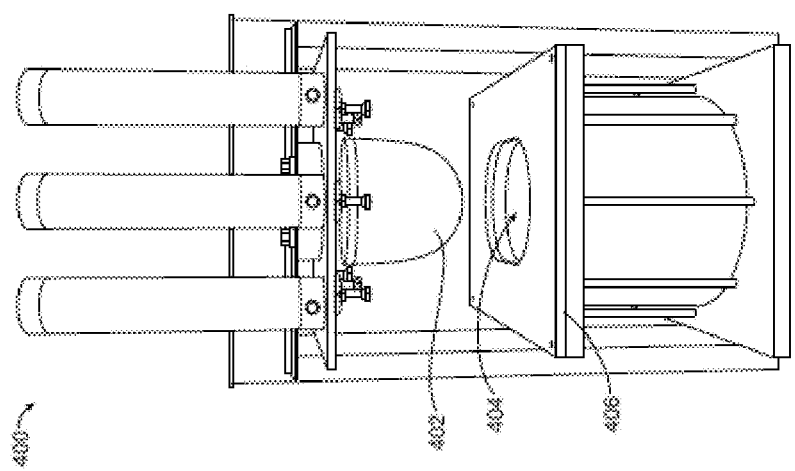
FIG. 3 illustrates an exemplary die press apparatus incorporating aspects of the disclosed embodiments.
Figure 4:
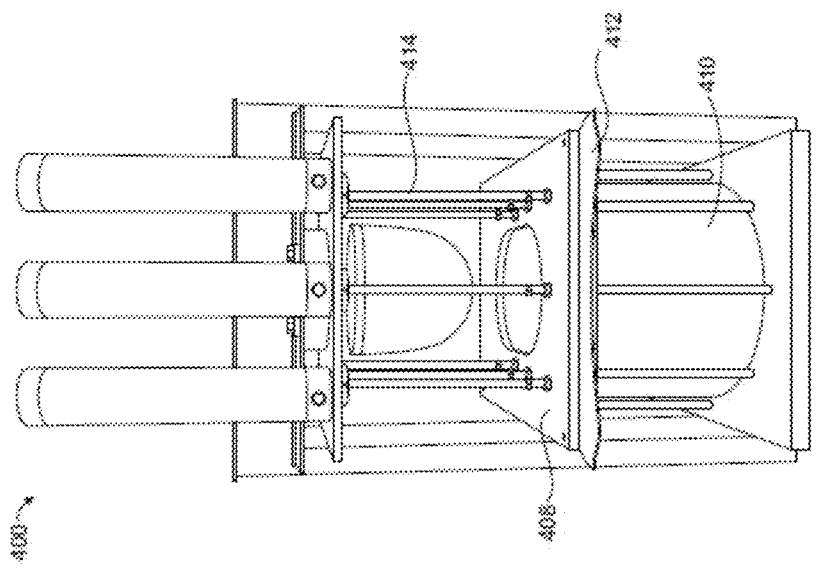
FIG. 4 illustrates an exemplary die press apparatus incorporating aspects of the disclosed embodiments showing the metal molding tool with a ply stack between the actuating punch and the pressure vessel.
Figure 5:
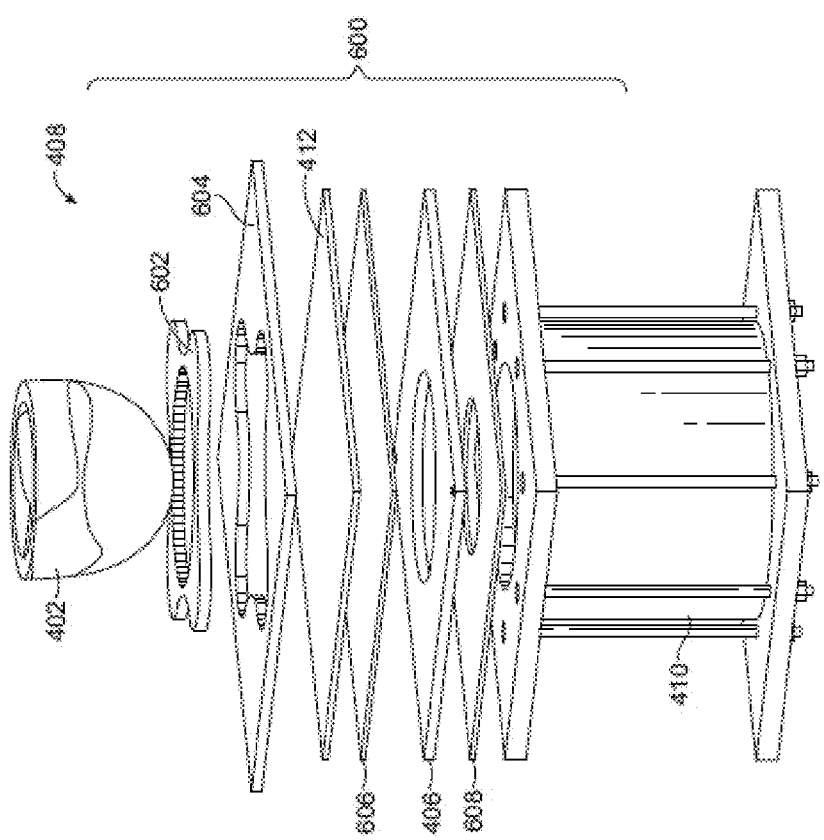
FIG. 5 illustrates an exploded assembly view of the actuating punch for a die press apparatus incorporating aspects of the disclosed embodiments.

Plies which cover the entire surface area of the preform are termed full plies and plies from which material is removed are termed filler plies. Referring also to FIGS. 3-5, the filler plies are shaped such that they extend into the binder clamp region of the preform apparatus 400 so that the binder clamps can apply in-plane tension forces as the ply stack-up assembly 412 is pushed through the flat die plate 406 as will be described further herein, in order to reduce out-of-plane ply wrinkling and prevent the plies from shifting during the forming operation.

The filler plies are placed in between full plies (or other filler plies including layering subsequent filler plies in topographic order in which layer transitions are reduced or increased according to a desired metric) building a multi-layer stack prior to the net-shape forming step. The number of layers in the ply stack 412 is subject to prepreg tolerances and dimensions but can range from 20 to 200, depending on the specific composite design and thickness(es) of individual plies (commercial sheets are often sold as [0/90]$_2$ plies). The filler plies can be left free to move independently of the full plies or they can be adhered to full plies with heat and pressure or adhesive properties of the ply. This can be accomplished, for example, by means of a laminating press. Alternatively, filler plies can be adhered to the full plies in specific locations. This can be accomplished, for example, by placing shims on the locations to be adhered before placement in the laminating press.

Ply stacks 412 of a select full ply/filler ply layup once assembled may be further modified by addition of one or more plies on the top or bottom of a ply stack 412. One such modification is a "release" full/filler ply used on the top or bottom of the stack 412. One such full ply is a layer of latex put on the bottom of the ply stack 412. Another such modification is a latex layer that is put on the top of the ply stack 412. Another such modification is where the latex layer that is put on the top of the ply stack 412 of the layup has its center cut out such that it matches the projected area of the punch 402. This assembled layup is then placed in between the die plate 406 (bottom) and a multi piece binder plate assembly 408 (top). While the binder plate 408 may be generally described herein with respect to a single plate, the aspects of the disclosed embodiments are not so limited. In alternate embodiments, the binder plate assembly 408 may have any practicable number of pieces or plates. For example, the binder plate assembly 408 can have 1-10 plates. In a typical embodiment, the binder plate assembly 408 can have 2-5 pieces or plates.

In one embodiment, to ensure that the layup does not shift around and the die plate and the binder plate 408 stay aligned, in one embodiment, the four corners of the die plate 406 and at least the outer binder plate 408 are secured together to sandwich the ply stack 412. It will be understood that when more than one binder plate 408 is used the other binder plates 408 can be secured together as well. The plates 406, 408 can be secured together in any suitable manner, such as for example, by using bolts. In alternate embodiments, any suitable manner of securing the plates 406, 408 together can be used.

Net-Shape Forming

This step transforms a single ply or stack of plies into a net-shape of the desired object, such as a helmet. This is accomplished with a specially designed preforming device, such as the preforming device 400 illustrated in FIGS. 3-5. The preforming device 400 allows for the forming of the near-net shape helmet preform 20 without inducing wrinkles or folds into the material. Preventing wrinkling of the material is of utmost importance for ballistic performance. Helmets made according to the methods of the disclosed embodiments have high uniform thickness and consolidation tolerances. Using the methods disclosed herein, thickness may be controlled to plus or minus 1; ply thickness may be controlled to be within approximately 127 µm (0.005 in.) to 305 µm (0.012 in.) of the intended thickness. A typical ply thickness used may be approximately 140 µm (0.0055 in.) thick.

FIGS. 3 and 4 illustrate an exemplary preforming device 400, also referred to herein as a die press apparatus 400. In this example, the die press apparatus 400 includes a punch 402 and a die plate 406. As illustrated in FIG. 3-4 as well as FIG. 5, the die plate 406 includes an opening or cut out 404. One skilled in the art will appreciate that other metal molding tools may be designed in accordance with specific manufacturing goals such as speed, processing steps and available electric, pressure and temperature tolerances.

As shown in FIGS. 3-5, in one embodiment, the die press apparatus 400 can also include one or more binder plates 408 and a pressure vessel 410. In the example of FIG. 5, a ply stack 412 is disposed between the one or more binder plates 408 and the pressure vessel 410. The components of the die press apparatus 400 will be described in further detail below.

Punch 402

The punch 402 generally comprises an actuating punch preforming tool. The purpose of the punch 402 is to drive the material or ply stack 412 through the opening 404 in the die plate 406 and act as a mold for the net-shape preform. In one embodiment, the punch 402 is in the shape of the inner surface of the net-shape preform, such as the net shape preform 20 shown in FIG. 2. The actuating punch preforming tool 400 can be pneumatic, hydraulic, electric, or manually actuated. For example, the actuator for the punch 402 can be a ball screw driven by a servomotor.

In one embodiment, the punch 402 can include one or more water jackets inside the punch 402. The one or more water jackets can be configured to allow heated fluid to be circulated through the punch 402 to control the temperature of the punch surface during the forming process. In alternate embodiments, the temperature control of the punch 402 can comprise any suitable cooling devices(s) other than including water jackets.

Die Plate 406

The die plate 406 generally comprises a flat plate. In one embodiment, the die plate 406 includes an opening or cut out 404. The cut out 404 is generally in the shape of the projection of the base of the punch 402, plus an offset distance which constitutes the die gap. The punch 402 is configured to be drivable through at least a portion of the cut out 404 in the die plate 406. The purpose of the die plate 406 is to constrain the fibers in the ply stack 412 to prevent wrinkling during forming.

In one embodiment, the edges of die plate 406, or of the opening 404, have a small radius (such as a fillet rounding corner or chamfer) which prevents damage to the material and permits a smooth transition from die plate 406 to the die opening 404. The size of the die gap and the die radius is important in preventing wrinkling. Suitable dimensions for the die gap are 250 um (0.010 in.)-12.7 mm (0.50 in.) and depend on the number of plies being formed along with the thickness of the release film and elastomeric membrane (if used). The die fillet or chamfer radius may be within approximately 0.397 mm-6.3 mm (1/64-1/4 inch), more preferably the radius is about 0.8 mm (1/32 inch). In one embodiment, the die plate 406 may also have heating and cooling capabilities.

In one embodiment, the die plate 406 is optionally sealed to the pressure vessel 410. This can include sealing the die plate 406 to the pressure vessel 410 with an O-ring or a rubber membrane 608, as shown in FIG. 5, depending on the desired pressure. In one embodiment, the rubber membrane 608 is interchangeable in order to adjust the die gap depending on the material and number of plies being formed.

Binder Plate(s) 408

The binder plate, or plates, 408 is generally configured to constrain the periphery of the ply or ply stack 412 to the die plate 406 during forming. The purpose of the binder plate 408 is to, along with the die plate 406, apply in-plane tension to the plies 412 in order to prevent wrinkling. As noted above, the binder plate 408, also referred to herein as a binder plate assembly, can be made up of one plate, or, as illustrated in FIG. 5, several plates that are configured to move independently of each other. In the example of FIG. 5, the preform assembly 600 includes at least an inner binder plate 602 and at least an outer binder plate 604. In alternate embodiments, the binder plate assembly 408 can include any suitable number of plates other than including an inner binder plate and an outer binder plate. The binder plate assembly 408 may also have heating and cooling capabilities incorporated therein.

Each binder plate 408 is actuated by multiple independent actuators or cylinders 414, also referred to herein as "binder clamps". The binder clamps 414 are generally configured to be activated and operate individually and independently from one another. In the example of FIG. 3, the binder clamps 414 are in a retracted position or state. In the example of FIG. 5, the binder clamps 414 are in an actuated state and engaged on or with the binder plate assembly 408. Although only one binder clamps 414 is generally referenced, more than one binder clamps 414 is illustrated. The aspects of the disclosed embodiments are not intended to be limited by the number of binder clamps 414 and the apparatus 400 can include any suitable number of binder clamps 414 that are needed to apply the desired amount of force and constraint.

The binder clamps 414 can be hydraulic, pneumatic, electric, or manual, allowing independent adjustment of binder force to regions around the periphery of the die plate 406. These binder clamps 414 allow different forces to be applied around the periphery of the ply stack 412 during forming to control where deformation is occurring.

Pressure Vessel 410

As illustrated in FIGS. 3-5, in one embodiment the pressure vessel 410, which is optional, sits underneath the die plate 406 and can be sealed to the pressure vessel 410. In one embodiment, the die plate 406 is sealed to the pressure vessel 410 with, for example, an O-ring 608. In another embodiment, referring to FIG. 5, a membrane 606 is placed between the ply stack 412 and the die plate 406. The membrane 606 is configured to provide a seal to the pressure vessel 410. In one embodiment, the membrane 606 can be used in lieu of the pressure vessel 410. The membrane 606 can comprise a latex material, for example. Alternately, the membrane 606 can comprise any suitable material that is configured to provide the desired sealing properties.

The punch 402 is configured to drive the ply stack 412 through the die opening 404 into the pressurized vessel 410. The purpose of the pressure vessel 410 is to apply a force normal to the ply stack 412 and punch 402 as the ply stack 412 is being pushed against the surface of the punch 402 during forming in order to prevent wrinkling from occurring. The pressure vessel 410 is capable of being suitably pressurized with gas or fluid. The fluid can be heated or temperature controlled.

In one embodiment, the pressure vessel 410 is pressurized to approximately 1-340 atm (10-5000 psi), more preferably 1-14 atm (10-200 psi), most preferably about 3.5 atm (50 psi). In one embodiment, the pressure in the pressure vessel 410 is varied between about 1-14 atm (10-200 psi) as a function of time (or displacement) as the punch 402 is actuated through the opening 404 in the die plate 406. In a further embodiment, the pressure vessel 410 is pressurized to between about 1-14 atm (10-200 psi) only after the punch 402 is completely through the opening 404 in the die plate 406.

During the forming process, a ply or stack of plies 412 with or without filler plies is laid out for the creation of the desired part thickness. In one embodiment, a high temperature release film with high ductility can be placed on the top and bottom of the ply or ply stack 412. The stack 412 is placed between two membranes. The top membrane may or may not have the punch shape cut out in the center. Referring to FIG. 5, the ply stack 412 along with the release film and membranes is placed between the die plate 406 and the binder plate(s) 408, which are located below and above, respectively. In this example, the binder plates 408 include an inner binder plate 602 and an outer binder plate 604. Depending on the material being formed, the die plate 406 and the binder plates 408 may be secured together such as by clamping in order to constrain the fibers within each ply to prevent annealing during the forming process.

The ply stack 412 may then be placed into an oven for a desired amount of time to enable resin or matrix softening. Once the material reaches the desired forming temperature, it is placed into the forming tool or die press apparatus 400. The die plate 406 is placed on top of the pressure vessel 410 and the binder clamps 414 are actuated.

The punch 402 is activated driving the material of the ply stack 412 through the opening 404 in the die plate 406 at a carefully controlled rate. As the material is being pushed through the die gap in the opening 404, the pressure vessel 410 is pressurized. The punch 402 will be extended to the desired point where the material is fully formed into the desired net shape. Multiple "stacks" can be formed independently consisting of less than the desired final product thickness and stacked together during the final consolidation step. Alternatively, the entire stack can be formed at once.

Consolidation

After the ply stack 412 has been formed into a net-shape preform, such as the net shape preform 20 illustrated in FIG. 2, the net shape preform 20 may then be optionally placed into a press with matched die tooling. The net-shape preform part is placed onto the core and the mold is closed, but the press cylinder is not pressurized. The core and cavity are preheated to the desired temperature. After the core and cavity have reached the desired temperature, the part may be left to heat soak for some time before the pressure cylinder is pressurized. Once the press cylinder is pressurized, the temperature of the core and cavity may be increased. Once the part has been consolidated, the core and cavity are cooled and the part is removed.

In an alternative two-step consolidation process, the part is consolidated as described above, but is then reconsolidated. A compliant material (e.g. membrane 606 see FIG. 5) is placed across the cavity and is deformed onto the surface of the part when the mold is closed. The consolidation process described above is repeated with the compliant material on the surface of the part.

The following examples illustrate specific aspects of the disclosed embodiments.

Example I: Processing a Fully Consolidated Helmet Using DSM Dyneema™ HB210 with the HEADS-UP ATO Helmet Tool at 0.669 g/Cm² (1.37 Psf) with a One-Step Consolidation

BACKGROUND

The following is an example of utilizing a commercially available material, such as DSM Dyneema™ HB210, to fabricate a combat helmet with an areal density of 0.669 g/cm² (1.37 psf). DSM Dyneema™ HB210 is supplied as a sheet material on a 1.6 m (63") wide roll. The layup consisted of 48 Dyneema™ HB210 layers in total and the preform is formed in a single stack, consisting of a $[0,90]_{96}$ layup, the factor of two difference between plies and layers is due to the Dyneema™ HB210 being provided in a $[0,90,0,90]_1$ construction.

The material is cut from the roll into various ply shapes, preformed into an unconsolidated helmet shape, and finally consolidated in a matched-die tool. The shape of the matched-die tool is an experimental helmet shape developed as part of the U.S. Army Helmet Electronics and Display System-Upgradeable Protection (HEADS-UP) Army Technology Objective (ATO). The shape, an example of which is shown in FIG. 1, was developed based on a robust 3D anthropometric data set. The matched-die tool has a uniform die gap of 5.969 mm (0.235 in.).

Ply Shaping

When cut from the roll, the DSM Dyneema™ HB210 sheet material is cut into 53.34 cm (21 in.) squares. The sheet stock has an average thickness of 140 μm (0.0055 in.). A layup of 48 sheets was developed to fill the 5.969 mm (0.235 in.) gap of the matched-die molding tool. During the preforming process, regions of these 53.34 cm (21 in.) square plies thicken due to intra-ply shear. To account for this variation in thickness which occurs during forming, a series of shapes were developed where material has been cut away from the regions of the 53.34 cm (21 in.) square sheets which thicken during forming. Examples of these shapes are illustrated in FIGS. 6-19, as described earlier. Without this modification, the preformed helmet layup would produce differences in thickness across the surface of the helmet preform 20, such that the matched-die consolidation helmet tool would not uniformly consolidate the helmet. The goal is to have a preform of uniform thickness, so the matched-die tool will apply a balanced uniform pressure across the surface of the helmet preform for proper consolidation.

During the preforming process of full 53.34 cm (21 in.) square sheets, a thickness profile was created. Thickness changes were mapped based off of a 25.4 mm (1 in.) grid pattern that was drawn on a full 53.34 cm (21 in.) square sheet. From this thickness profile "filler ply" shapes were developed by cutting away material in the areas that had an increase in thickness. The objective is to blend various "filler ply" shapes and full ply sheets into a layup so that the end result is a helmet that has uniform thickness and consolidation. Using this method, thickness was able to be controlled to plus or minus 1 ply thickness (140 μm). The exemplary filler ply shapes are shown in FIGS. 6-19. The plies were stacked up in the order listed in Table 1, where the letters correspond to filler ply shapes illustrated in FIGS. 6-19, and referred to hereafter as the ply-stack. Ply shape A refers to a full ply. Ply 1 is the inner surface of the helmet and refers to the top of the ply-stack during the forming.

TABLE 1

Ply stacking sequence (refer to FIGS. 6-19 for ply shape description).

| Ply Number | Ply Shape |
|---|---|
| 1 | A |
| 2 | A |
| 3 | A |
| 4 | B |
| 5 | H |
| 6 | M |
| 7 | I |
| 8 | B |
| 9 | H |
| 10 | C |
| 11 | A |
| 12 | E |
| 13 | H |
| 14 | I |
| 15 | A |
| 16 | B |
| 17 | H |
| 18 | D |
| 19 | I |
| 20 | C |
| 21 | H |
| 22 | E |
| 23 | A |
| 24 | C |
| 25 | H |
| 26 | D |
| 27 | A |
| 28 | B |
| 29 | H |
| 30 | F |
| 31 | A |
| 32 | L |
| 33 | H |
| 34 | N |
| 35 | A |
| 36 | O |
| 37 | H |
| 38 | C |
| 39 | A |
| 40 | F |
| 41 | H |
| 42 | J |
| 43 | A |
| 44 | F |
| 45 | K |
| 46 | A |
| 47 | A |
| 48 | A |

Forming

The preforming tool, such as the die press apparatus 400 of FIGS. 3-4, has a punch attached to a hydraulic piston. The punch 402 is identical in shape to the core of the matched-die molding tool. The present helmet is preformed in one step. There is an approximately 53.34 cm (21 in.) die plate 406 which had its center cut away to match the shape of the projected area of the punch 402, plus a specified offset constituting a die gap, which, in the present example, was 9.525 mm (0.375 in.). In this example, the preforming tool 400 uses a two-piece binder plate system 408, each plate being actuated by (76.2 mm (3 in.) bore pneumatic cylinders 414 each set to 8.27 bar (120 psi).

A release film was placed on the top and bottom of the ply-stack 412, followed by a full sheet of 4.76 mm (³⁄₁₆ in.) thick latex put on the bottom and a second sheet of latex that is put on the top. The latex sheet placed on top has its center cut out to match the projected area of the punch 402. This layup is then placed in between the die plate 406 (bottom) and two piece binder plate assembly 408 (top). To ensure that the layup does not shift around and the plates stay aligned, and to prevent annealing of the fibers during the next step (preheating), the four corners of both plates 406, 408 are bolted together in order to constrain the ply-stack 412. The ply stack 412 is placed on the die plate 406 such that the fiber direction of each ply is orientated with the sagittal and coronal planes of the helmet.

The preforming apparatus 400 of this example is shown in FIGS. 3-4, and a detailed exploded view highlighting the preform assembly is shown in FIG. 5. This preform assembly is then inserted into a preheated oven at a temperature of 125° C. and held for a total of 30 minutes to soften the matrix within each ply. After the preform assembly has been heated in the oven for 30 minutes, it is removed and placed on top of a custom made pressure vessel 410.

The pressure vessel 410 has a top plate with a center opening profile that is the projected area of the punch 402 plus 25.4 mm (1 in.) clearance around the perimeter. A third sheet of latex sits on top of the pressure vessel plate 410 and seals the die plate 406 to the pressure vessel 410. The center 404 has been removed to the copy the shape of the punch 402 but the cut out is significantly smaller than the punch 402. A latex sheet extends over the plate edge by 50.8 mm (2 in.) around the perimeter of the opening 404 in the plate.

Once the pressure vessel 410, preform assembly 600 and punch 402 are aligned, clamping pressure is applied from above through the use of pneumatic cylinders 414. These cylinders 414 are positioned on a base plate so that each one engages a specific location on the two piece binder plate 408 below. The pneumatic cylinders 414 are pressurized, activating the binder plates 408. The punch 402 is then driven through the opening 404 in binder 408 and die plates 406 into the ply-stack 412, driving into the pressure vessel 410.

Until the punch 402 makes contact with the layup from above, the pressure vessel 410 remains at atmospheric pressure. Once the punch 402 engages the layup, the pressure vessel 410 is pressurized to 3.65 bar (53 psi). After several minutes of cooling, the preformed sample can be removed. A preform 20 is shown in FIG. 2 prior to consolidation.

Consolidation

The press cycle consists of three stages, preheat, consolidation, and cool down. The matched-die tool is preheated with steam to a temperature between 121° C. (250° F.) and 149° ° C. (300° F.), more preferably, between 135° C. (275° F.) and 149° ° C. (300° F.). The net-shape preform part is placed onto the core and the mold is closed, but the press cylinder is not pressurized. The preformed helmet is heated to the set temperature over a 10 minute period of time. After the ten minute soak at temperature, a force of 350 tons is applied. This consolidation step will run for a total time between 10 and 30 minutes at the temperature set point with a constant force of 3,110 kN (350 tons). After the consolidation step, while still applying the force of 350 tons, the steam flow to the tool is stopped and water chilled to 10° C. (50° F.) is circulated through the tool until the tool temperature is at/or below 26.7° C. (80° F.). Upon completion, the tool is opened and the helmet is removed. There is some post process steps where the final helmet shape is cut from the consolidated part. A fully consolidated helmet 10 is shown in FIG. 1. The helmet 10 in FIG. 1 has not been trimmed to the final cutline.

Example II: Processing a Fully Consolidated Helmet Using DSM Dyneema™ HB210 with the HEADS-UP ATO Helmet Tool at 0.669 g/Cm² (1.37 Psf) with a Two-Step Consolidation

BACKGROUND

The following is an example of utilizing a commercially available material, DSM Dyneema™ HB210, to fabricate a combat helmet, identical to example I above, but with an additional secondary consolidation step implementing a compliant buffer material between the helmet and the cavity of the match-die compression mold. The helmet was consolidated in the HEADS-UP ATO matched-die tool with a uniform die gap of 5.969 mm (0.235") (see Example I).

Ply Shaping

See Example I.

Forming

See Example I.

Consolidation

The press cycle consists of two steps, each consisting of three stages or segments, preheat, consolidation, and cool down. The matched-die tool is preheated with steam to a temperature between 121° C. (250° F.) and 149° C. (300° F.), more preferably, between 135° C. (275° F.) and 149° ° C. (300° F.). The net-shape preform part is placed onto the core and the mold is closed, but the press cylinder is not pressurized. The preformed helmet is heated to the set temperature over a 10 minute period of time. After the ten minute soak at temperature, a force of 3,110 kN (350 tons) is applied. This consolidation step will run for a total time between 10 and 30 minutes at the temperature set point with a constant force of 3,110 kN (350 tons). After the consolidation step, while still applying the force of 3,110 kN (350 tons), the steam flow to the tool is stopped and water chilled to 10° C. (50° F.) is circulated through the tool until the tool temperature is at/or below 26.7° C. (80° F.). Upon completion, the tool is opened and the helmet is removed.

Next a compliant a 3.175 mm (0.125 in.) thick latex sheet is stretch across the cavity opening of the matched-die tool and fastened around the perimeter of the cavity. A breather material is placed between the latex sheet and the cavity to prevent air becoming trapped as the mold is closed. The matched-die tool is preheated with steam to a temperature between 121° ° C. (250° F.) and 149° C. (300° F.), more preferably, between 135° C. (275° F.) and 149° C. (300° F.). Once the tool is at the set temperature for processing, the preform is positioned on the core of the matched-die molding tool. The press is then closed, driving the helmet into the elastomeric material causing it to stretch to the shape of the helmet and fill the gap between the helmet and the cavity of the matched-die tool. The mold is closed, but the press cylinder is not pressurized. The preformed helmet is heated to the set temperature over a 10 minute period of time. After the ten minute soak at temperature, a force of 3,110 kN (350 tons) is applied. Note, the latex is not confined around the periphery of the helmet. If the latex were confined, the helmet would be in a hydrostatic stress state and this would prevent the removal of voids and the redistribution of matrix material that occurs within the helmet during consolidation in a matched-die tool. This consolidation step will run for a total time between 10 and 30 minutes at the temperature set point with a constant force of 3,110 kN (350 tons). After the consolidation step, while still applying the force of 350 tons, the steam flow to the tool is stopped and water chilled to 10° C. (50° F.) is circulated through the tool until the tool temperature is at/or below 26.7° C. (80° F.). Upon completion, the tool is opened and the helmet is removed. The compliant membrane placed between the helmet and the cavity, but not confined around the periphery of the tool, helps to insure even pressure distribution across the surface of the tool and reduce voids within the helmet.

Example III: Processing a Fully Consolidated Helmet Using DSM Dyneema™ HB210 with the HEADS-UP ATO Helmet Tool at 0.669 g/Cm² (1.37 Psf) with a One-Step Consolidation, where Half the Preform is Indexed 45 Degrees

BACKGROUND

The following is an example of utilizing a commercially available material, DSM Dyneema™ HB210, to fabricate a combat helmet. This example differs from Example I in that a different layup is utilized. In particular, the preform is formed in two stacks, and one is rotated 45 degrees about the axis created by the sagittal and coronal planes of the helmet. The helmet layup consisted of 51 Dyneema™ HB210 plies in total, consisting of a $[0,90]_{52}$, $[-45,45]_{50}$ layup. Each ply stack consists of 26 layers and 25 layers, respectively, the factor of 2 difference between plies and layers is due to the Dyneema™ HB210 being provided in a $[0,90,0,90]_1$ construction. The helmet was consolidated in the HEADS-UP ATO matched-die tool with a uniform die gap of 5.969 mm (0.235 in.) (see Example I).

Ply Shaping

When cut from the roll, the DSM Dyneema™ HB210 sheet material is cut into 53.34 cm (21 in.) squares. The sheet stock has an average thickness of 140 µm (0.0055 in.). A layup of 51 sheets was developed to fill the 5.969 mm (0.235 in.) gap of the matched-die molding tool. During the preforming process, regions of these 53.34 cm (21 in.) square plies thicken due to intra-ply shear. To account for this variation in thickness which occurs during forming, a series of shapes were developed where material has been cut away from the regions of the 53.34 cm (21 in.) square sheets which thicken during forming. Without this modification, the preformed helmet layup would produce such a difference in thickness across the surface of the helmet preform, that the matched-die consolidation helmet tool would not uniformly consolidate the helmet. The goal is to have a preform of uniform thickness, so the matched-die tool would apply a balanced uniform pressure across the surface of the helmet preform for proper consolidation.

During the preforming process of full 53.34 cm (21 in.) square sheets, a thickness profile was created. Thickness changes were mapped based off of a 25.4 mm (1 in.) grid pattern that was drawn on a full 53.34 cm (21 in.) square sheet. From this thickness profile "filler ply" shapes were developed by cutting away material in the areas that had an increase in thickness. The objective is to blend various "filler ply" shapes and full ply sheets into a layup so that the end result is a helmet that has uniform thickness and consolidation. Using this method, thickness was able to be controlled to plus or minus 1 ply thickness (140 µm). The plies are shown in FIGS. 6-19. Ply shape A corresponds to a full ply. The helmet was formed in two steps, from two ply-stacks, the plies were stacked in the order listed in Table 2 and Table 3. Ply 1 of stack 1 is the inner surface of the helmet and refers to the top of the ply-stack during the forming.

TABLE 2

Ply stacking sequence for first ply stack (inside of helmet) (refer to FIGS. 6-19 for ply shape description).

| Ply Number | Ply Shape |
| --- | --- |
| 1 | A |
| 2 | B |
| 3 | C |
| 4 | A |
| 5 | D |
| 6 | A |
| 7 | E |
| 8 | A |
| 9 | F |
| 10 | G |
| 11 | A |
| 12 | C |
| 13 | A |
| 14 | B |
| 15 | C |
| 16 | A |
| 17 | D |
| 18 | B |
| 19 | A |
| 20 | C |
| 21 | E |
| 22 | A |
| 23 | F |
| 24 | G |
| 25 | A |
| 26 | A |

TABLE 3

Ply stacking sequence for second ply stack (outside of helmet) (refer to FIGS. 6-19 for ply shape description).

| Ply Number | Ply Shape |
| --- | --- |
| 1 | A |
| 2 | A |
| 3 | B |
| 4 | C |
| 5 | A |
| 6 | D |
| 7 | E |
| 8 | A |
| 9 | F |
| 10 | G |
| 11 | A |
| 12 | E |
| 13 | B |
| 14 | A |
| 15 | B |
| 16 | C |
| 17 | A |
| 18 | D |
| 19 | A |
| 20 | B |
| 21 | E |
| 22 | A |
| 23 | F |
| 24 | G |
| 25 | A |

Forming

The preforming tool 400 has a punch 402 attached to a hydraulic piston. The punch 402 is identical in shape to the core of the matched-die molding tool. The present helmet is preformed in two steps. There is a 53.34 cm (21 in.) die plate 406 which had its center cut away to form opening 404 to match the shape of the projected area of the punch 402, plus a specified offset constituting a die gap, which, in the present example, was 4.763 mm (0.1875 in.). The preforming tool 400 uses a two-piece piece binder plate assembly 408. Each plate of the binder plate assembly 408 was actuated by (76.2 mm (3 in.) bore pneumatic cylinders 414, each set to 8.27 bar (120 psi).

A release film was placed on the top and bottom of each ply-stack 412, followed by a full sheet of 4.76 mm (3/16 in.) thick latex put on the bottom of each ply stack 412 and a second sheet of latex that is put on the top of each ply stack 412. The latex sheet placed on top of each ply stack 412 has its center cut out to match the projected area of the punch 402. This layup is then placed in between the die plate 406 (bottom) and the two piece binder plate assembly 408 (top). To ensure that the layup does not shift around and the plates 406, 408 stay aligned, and to prevent annealing during the next step (preheating), the four corners of the plates 406, 408 are bolted together in order to constrain the ply-stack 412. The first ply stack is placed on the die plate 406 such that the fiber direction of each ply is orientated with the sagittal and coronal planes of the helmet.

This preform assembly 600 is then inserted into a preheated oven at a temperature of 125° C. and held for a total of 30 minutes to soften the matrix within each ply. After the preform assembly 600 has been heated in the oven for 30 minutes, it is removed and placed on top of a custom made pressure vessel 410. The pressure vessel 410 has a top plate with a center opening profile that is the projected area of the punch 402 plus 25.4 mm (1 in.) clearance around the perimeter. A third sheet of latex sits on top of the pressure vessel plate and seals the die plate 406 to the pressure vessel 410. The center has been removed to the copy the shape of the punch 402 but the cut out is significantly smaller than the size of the punch 402. The latex sheet extends over the plate edge by 50.8 mm (2 in.) around the perimeter of the opening 404 in the plate 406. Once the pressure vessel 410, preform assembly 600 and punch 402 are aligned, clamping pressure is applied from above through the use of pneumatic cylinders 414. These cylinders 414 are positioned on a base plate so that each one engages a specific location on the custom two piece binder plate assembly 408 below. The pneumatic cylinders 414 are pressurized, activating the binder plate assembly 408. The punch 402 is then driven through the opening, generally shown as opening 404, in the binder 408 and die plates 406 into the ply-stack 412, driving into the pressure vessel 410. Until the punch 402 makes contact with the layup from above, the pressure vessel 410 remains at atmospheric pressure. Once the punch 402 engages the layup, the pressure vessel 410 is pressurized to 3.65 bar (53 psi). After several minutes of cooling, the preformed sample can be removed.

The outer ply stack (Table 3) is formed first followed by the inner ply stack (Table 2). The second ply stack is rotated 45 degrees about the axis created by the sagittal and coronal planes of the helmet with respect to the die opening. Once both ply stacks are formed, the preforms are stacked prior to consolidation.

Consolidation

The press cycle consists of three stages, preheat, consolidation, and cool down. The matched-die tool is preheated with steam to a temperature between 121° C. (250° F.) and 149° C. (300° F.), more preferably, between 135° C. (275° F.) and 149° C. (300° F.). The net-shape preform part is placed onto the core and the mold is closed, but the press cylinder is not pressurized. The preformed helmet is heated to the set temperature over a 10 minute period of time. After the ten minute soak at temperature, a force of 350 tons is applied. This consolidation step will run for a total time between 10 and 30 minutes at the temperature set point with a constant force of 3,110 kN (350 tons). After the consolidation step, while still applying the force of 350 tons, the steam flow to the tool is stopped and water chilled to 10° C. (50° F.) is circulated through the tool until the tool temperature is at/or below 26.7° C. (80° F.). Upon completion, the tool is opened and the helmet is removed. There is some post process steps where the final helmet shape is cut from the consolidated part.

Example IV: Processing a Fully Consolidated Helmet Using DSM Dyneema™ HB210 with the HEADS-UP ATO Helmet Tool at 1.03 g/Cm² (2.1 Psf) with a One-Step Consolidation

BACKGROUND

The following is an example of utilizing a commercially available material, DSM Dyneema™ HB210, to fabricate a combat helmet with an areal density of 1.03 g/cm² (2.1 psf). This example differs from Example I in that the helmet is a higher areal density. The layup consisted of 78 Dyneema™ HB210 plies in total and the preform is formed in two stacks, both consisting of a $[0,90]_2n$ layup, where n is the number of Dyneema™ HB210 layers in the ply stack, the factor of two due to the Dyneema™ HB210 being provided in a $[0,90,0,90]_1$ construction. The helmet shape is the same as that in examples I-III, so the matched-die mold is the same except the mold gap is 10.1 mm (0.397 in.).

Ply Shaping

When cut from the roll, the DSM Dyneema™ HB210 sheet material is cut into 53.34 cm (21 in.) squares. The sheet stock has an average thickness of 140 μm (0.0055 in.). A layup of 78 sheets was developed to fill the 10.1 mm (0.397 in.) gap of the matched-die molding tool. During the preforming process, regions of these 53.34 cm (21 in.) square plies thicken due to intra-ply shear. To account for this variation in thickness which occurs during forming, a series of shapes were developed where material has been cut away from the regions of the 53.34 cm (21 in.) square sheets which thicken during forming. Without this modification, the preformed helmet layup would produce such a difference in thickness across the surface of the helmet preform, that the matched-die consolidation helmet tool would not uniformly consolidate the helmet. The goal is to have a preform of uniform thickness, so the matched-die tool would apply a balanced uniform pressure across the surface of the helmet preform for proper consolidation.

During the preforming process of full 53.34 cm (21 in.) square sheets, a thickness profile was created. Thickness changes were mapped based off of a 25.4 mm (1 in.) grid pattern that was drawn on a full 53.34 cm (21") square sheet. From this thickness profile "filler ply" shapes were developed by cutting away material in the areas that had an increase in thickness. The objective is to blend various "filler ply" shapes and full ply sheets into a layup so that the end result is a helmet that has uniform thickness and consolidation. Using this method, thickness was able to be controlled to plus or minus 1 ply thickness (140 μm). The plies are shown in FIGS. 6-19. Ply shape A refers to a full ply. The helmet was formed in two steps, from two ply-stacks, the plies were stacked in the order listed in Table 4 and Table 5.

Ply 1 of stack 1 is the inner surface of the helmet and refers to the top of the ply-stack during the forming.

TABLE 4

Ply stacking sequence for first ply stack (inside of helmet) (refer to FIGS. 6-19 for ply shape description).

| Ply Number | Ply Shape |
|---|---|
| 1 | A |
| 2 | F |
| 3 | C |
| 4 | B |
| 5 | A |
| 6 | H |
| 7 | I |
| 8 | E |
| 9 | A |
| 10 | H |
| 11 | D |
| 12 | F |
| 13 | A |
| 14 | H |
| 15 | L |
| 16 | O |
| 17 | A |
| 18 | H |
| 19 | C |
| 20 | B |
| 21 | A |
| 22 | H |
| 23 | N |
| 24 | I |
| 25 | A |
| 26 | H |
| 27 | M |
| 28 | K |
| 29 | A |
| 30 | H |
| 31 | J |
| 32 | F |
| 33 | A |
| 34 | H |
| 35 | C |
| 36 | B |
| 37 | A |
| 38 | H |
| 39 | I |
| 40 | A |

TABLE 5

Ply stacking sequence for second ply stack (outside of helmet) (refer to FIGS. 6-19 for ply shape description).

| Ply Number | Ply Shape |
|---|---|
| 1 | A |
| 2 | H |
| 3 | E |
| 4 | D |
| 5 | N |
| 6 | A |
| 7 | H |
| 8 | C |
| 9 | O |
| 10 | A |
| 11 | H |
| 12 | B |
| 13 | J |
| 14 | A |
| 15 | H |
| 16 | I |
| 17 | K |
| 18 | A |
| 19 | H |

TABLE 5-continued

Ply stacking sequence for second ply stack (outside of helmet) (refer to FIGS. 6-19 for ply shape description).

| Ply Number | Ply Shape |
|---|---|
| 20 | M |
| 21 | C |
| 22 | A |
| 23 | H |
| 24 | B |
| 25 | F |
| 26 | A |
| 27 | H |
| 28 | L |
| 29 | D |
| 30 | A |
| 31 | H |
| 32 | E |
| 33 | I |
| 34 | A |
| 35 | C |
| 36 | B |
| 37 | F |
| 38 | A |

Forming

The preforming tool 400 has a punch 402 attached to a hydraulic piston. The punch 402 is identical in shape to the core of the matched-die molding tool. The present helmet is preformed in two steps. There is a 53.34 cm (21") die plate 406 which had its center cut away to form opening 404, which matches the shape of the projected area of the punch 402, plus a specified offset constituting a die gap, which, in the present example, was 9.53 mm (0.375 in.). The preforming tool 400 uses a two-piece piece binder plate assembly 408. Each plate in the binder plate assembly was actuated by (76.2 mm (3")) bore pneumatic cylinders 414, or binder clamps, each set to 8.27 bar (120 psi).

A release film was placed on the top and bottom of each ply-stack 412, followed by a full sheet of 4.76 mm (³⁄₁₆") thick latex put on the bottom of each ply stack 412 and a second sheet of latex that is put on the top of each ply stack 412. The latex sheet placed on top of each ply stack 412 has its center cut out to match the projected area of the punch 402. This layup is then placed in between the die plate 406 (bottom) and two piece binder plate assembly 408 (top). To ensure that the layup does not shift around and the plates 406, 408 stay aligned, and to prevent annealing during the next step (preheating), the four corners of both plates 406, 408 are bolted together in order to constrain the ply-stack 412. Each ply stack 412 is placed on the die plate 406 such that the fiber direction of each ply is orientated with the sagittal and coronal planes of the helmet.

This preform assembly 600 is then inserted into a preheated oven at a temperature of 125° C. and held for a total of 30 minutes to soften the matrix within each ply. After the preform assembly 600 has been heated in the oven for 30 minutes, it is removed and placed on top of a custom made pressure vessel 410. The pressure vessel 410 has a top plate with a center opening profile that is the projected area of the punch 402 plus 25.4 mm (1 in.) clearance around the perimeter. A third sheet of latex sits on top of the pressure vessel plate and seals the die plate 406 to the pressure vessel 410. The center has been removed to the copy the shape of the punch 402 but the cut out is significantly smaller than the size or area of the punch 402. The latex sheet extends over the plate edge by 50.8 mm (2 in.) around the perimeter of the opening 404 in the plate 406. Once the pressure vessel 410, preform assembly 600 and punch 402 are aligned, clamping pressure is applied from above through the use of pneumatic cylinders 414. These cylinders or binder clamps 414 are positioned on a base plate so that each one engages a specific location on the custom two piece binder plate assembly 414 below. The pneumatic cylinders 414 are pressurized, activating the plates of the binder plate assembly 408. The punch 402 is then driven through the opening 404 in the binder plate assembly 408 and die plate 406 into the ply-stack 412, driving into the pressure vessel 410. Until the punch 402 makes contact with the layup from above, the pressure vessel 410 remains at atmospheric pressure. Once the punch 402 engages the layup, the vessel 410 is pressurized to 3.65 bar (53 psi). After several minutes of cooling, the preformed sample can be removed.

The outer ply stack (Table 3) is formed first followed by the inner ply stack (Table 2). Once both ply stacks are formed, the preforms are stacked prior to consolidation.

Consolidation

The press cycle consists of three stages, preheat, consolidation, and cool down. The matched-die tool is preheated with steam to a temperature between 121° C. (250° F.) and 149° ° C. (300° F.), more preferably, between 135° C. (275° F.) and 149° ° C. (300° F.). The net-shape preform part is placed onto the core and the mold is closed, but the press cylinder is not pressurized. The preformed helmet is heated to the set temperature over a 10 minute period of time. After the ten minute soak at temperature, a force of 350 tons is applied. This consolidation step will run for a total time between 10 and 30 minutes at the temperature set point with a constant force of 3,110 kN (350 tons). After the consolidation step, while still applying the force of 350 tons, the steam flow to the tool is stopped and water chilled to 10° C. (50° F.) is circulated through the tool until the tool temperature is at/or below 26.7° C. (80° F.). Upon completion, the tool is opened and the helmet is removed. There is some post process steps where the final helmet shape is cut from the consolidated part.

The aspects of the disclosed embodiments provide high performance protective material products protective against ballistic threats, especially high power penetration projectiles. In particular, the aspects of the disclosed embodiments provide ballistic helmets with pre-impregnated ('prepreg") fiber-reinforced composite materials. The aspects of the disclosed embodiments can also be applied to the fabrication of other lightweight armour products for individual protection (body armour and shields) and platform protection (aircraft, vehicles, shelters, and watercraft) which have curved features. Further, the aspects of the disclosed embodiments can also be applied to the fabrication of composite structural components which have curved features.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of forming a net shape preform for a high performance ballistic helmet comprising:
preparing one or more full prepreg plies;
preparing one or more filler prepreg plies,
wherein preparing the one or more filler prepreg plies comprises cutting material away from a region of the one filler prepreg ply and cutting material away from a region of the another filler prepreg ply, wherein a location of the region of the one filler prepreg ply is different from a location of the region of the another filler prepreg ply and wherein the shapes of the different filler prepreg plies in the stack form a series of progressively narrower X-shaped lobes having an arcuate portion disposed between each lobe,
wherein the shapes of the different filler prepreg plies in the stack form a series of progressively narrower X-shaped lobes whereby each filler prepreg ply in the stack has a progressively reduced surface area, and each has an arcuate portion located between arms that extend into a region constrained by binder plates,
wherein a shape and orientation of each filler prepreg ply of the one or more filler prepreg plies is different from a shape and orientation of every other filler prepreg ply of the one or more filler prepreg plies;
layering the one or more full prepreg plies with one or more filler prepreg plies to form a ply stack;
deforming a portion of the ply stack while constraining by mechanically clamping the ply stack thereby applying in-plane tensional force to each ply of the ply stack such that the filler prepreg plies are clamped together with the full prepreg plies including across an outer periphery of the ply stack to form the net-shape preform that has a generally uniform thickness that varies in thickness across the extent of the net-shape preform by no more than between 127 μm (0.005 in.) to 305 μm (0.012 in.).

2. The method according to claim 1, wherein the ply stack is disposed between a die plate and a binder plate of a die press apparatus and deforming the portion of the ply stack comprises:
actuating a punch of the die press apparatus to drive at least a portion of the ply stack through an opening in the die plate; and
providing a compliant sheet configured to deform with, and provide further clamping to, the ply stack.

3. The method according to claim 2, comprising heating the ply stack to a temperature in a range of to and including 250-500° ° C. for a period of about 1 minute to 24 hours, before activating the punch.

4. The method according to claim 3, further comprising clamping the ply stack between the die plate and the binder plate prior to heating.

5. The method according to claim 4 further comprising actuating one or more actuators on the binder plate(s) to constrain the ply stack and apply the in-plane tensional force to most of the area of the ply stack.

6. The method according to claim 5 further comprising applying a release film between the ply stack and the binder plate.

7. The method according to claim 6, further comprising
heating the net shape preform to a first temperature for a first predetermined period of time, applying a force to the heated net shape preform for a second predetermined period of time, and
cooling the net shape preform for a third period of time.

8. The method according to claim 7, wherein the first temperature is in the range of 121° C. (250° F.) to and including 149° C. (300° F.).

9. The method according to claim 8, further comprising
disposing an elastomeric material across the opening in the die plate and the binder plate,
heating the die plate apparatus and driving the net preform shape through the elastomeric material.

10. The method according to claim 6, further comprising driving the ply stack into an opening of a pressure vessel.

11. The method according to claim 10 further comprising pressurizing the pressure vessel when the punch engages the ply stack.

12. A method of forming a net shape preform for a high performance ballistic helmet comprising:
preparing one or more full prepreg plies;
preparing two or more filler prepreg plies, wherein a shape and orientation of each filler prepreg ply of the two or more filler prepreg plies is different from a shape and orientation of every other filler prepreg ply of the two or more filler prepreg plies;
layering the filler prepreg ply full prepreg plies with two or more filler prepreg plies to form a ply stack;
deforming a portion of the ply stack while constraining by mechanically clamping the ply stack thereby applying in-plane tensional force to each ply of the ply stack such that the filler prepreg plies are clamped together with the full prepreg plies including across an outer periphery of the ply stack to form the net-shape preform that has a generally uniform thickness that varies in thickness across the extent of the net-shape preform by no more than between 127 μm (0.005 in.) to 305 μm (0.012 in.);
further wherein preparing the one or more filler prepreg plies comprises cutting material away from a region of the one filler prepreg ply and cutting material away from a region of the another filler prepreg ply, wherein a location of the region of the one filler prepreg ply is different from a location of the region of the another filler prepreg ply and wherein the shapes of the different filler prepreg plies in the stack form a series of progressively narrower X-shaped lobes having an arcuate portion disposed between each lobe.

13. The method according to claim 12 wherein the shapes of the different filler prepreg plies in the stack form a series of progressively narrower X-shaped lobes whereby each filler prepreg ply in the stack has a progressively reduced surface area and each has an arcuate portion located between-arms that extend into a region constrained by binder plates.

* * * * *